United States Patent
Carlsson

(10) Patent No.: US 9,243,536 B2
(45) Date of Patent: Jan. 26, 2016

(54) METHOD FOR ENRICHING EXHAUST GASES WITH UNBURNT HYDROCARBON

(75) Inventor: Annika Carlsson, Kungälv (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/382,377

(22) PCT Filed: Mar. 14, 2012

(86) PCT No.: PCT/EP2012/001122
§ 371 (c)(1),
(2), (4) Date: Sep. 4, 2014

(87) PCT Pub. No.: WO2013/135250
PCT Pub. Date: Sep. 19, 2013

(65) Prior Publication Data
US 2015/0107227 A1    Apr. 23, 2015

(51) Int. Cl.
*F01N 3/00* (2006.01)
*F01N 3/20* (2006.01)
*F02D 41/02* (2006.01)
*F02D 41/40* (2006.01)
*F02D 21/08* (2006.01)
*F02D 41/00* (2006.01)
*F02M 25/07* (2006.01)
*F02B 29/04* (2006.01)

(52) U.S. Cl.
CPC ............ *F01N 3/2033* (2013.01); *F02D 21/08* (2013.01); *F02D 41/008* (2013.01); *F02D 41/025* (2013.01); *F02D 41/027* (2013.01); *F02D 41/405* (2013.01); *F02M 25/0717* (2013.01); *F02M 25/0749* (2013.01); *F02B 29/0406* (2013.01); *F02D 41/0055* (2013.01); *F02D 41/0072* (2013.01); *F02M 25/0707* (2013.01); *Y02T 10/26* (2013.01); *Y02T 10/44* (2013.01)

(58) Field of Classification Search
USPC ................... 60/274, 276, 277, 278, 285, 286
See application file for complete search history.

(56) References Cited

U.S. PATENT DOCUMENTS

| 5,839,415 | A | * | 11/1998 | Suzuki et al. ................. 123/491 |
| 5,987,884 | A | | 11/1999 | Kibe et al. |
| 6,041,591 | A | * | 3/2000 | Kaneko et al. ................. 60/274 |

(Continued)

FOREIGN PATENT DOCUMENTS

EP    0889220 A2    1/1999

OTHER PUBLICATIONS

International Search Report (Jan. 8, 2013) for corresponding International Application PCT/EP2012/001122.

(Continued)

*Primary Examiner* — Binh Q Tran
(74) *Attorney, Agent, or Firm* — WRB-IP LLP

(57) ABSTRACT

In a method for enriching the exhaust gases of a combustion engine with unburnt hydrocarbon engine operating conditions are monitored and in-cylinder post injection of unburnt hydrocarbon into one predetermined cylinder of at least two cylinders connected to an exhaust manifold is performed when the monitored engine operating conditions equal predetermined engine operating conditions. The predetermined engine operating conditions are set for resulting in a substantially zero flow of the post-injected hydrocarbon to an EGR circuit for the specific design of the engine in operation.

15 Claims, 2 Drawing Sheets

(56) References Cited

U.S. PATENT DOCUMENTS

| | | | |
|---|---|---|---|
| 6,141,959 A | 11/2000 | Digeser et al. | |
| 6,990,402 B2* | 1/2006 | Yasui et al. | 701/108 |
| 8,489,308 B2* | 7/2013 | Zanetti et al. | 701/103 |
| 8,985,088 B2* | 3/2015 | Blythe et al. | 123/568.22 |
| 2005/0241299 A1 | 11/2005 | Brown | |
| 2006/0196178 A1 | 9/2006 | Caine et al. | |
| 2008/0110161 A1 | 5/2008 | Persson | |

OTHER PUBLICATIONS

International Preliminary Report on Patentability (Aug. 22, 2014) for corresponding International Application PCT/EP2012/001122.

* cited by examiner

METHOD FOR ENRICHING EXHAUST GASES WITH UNBURNT HYDROCARBON

BACKGROUND AND SUMMARY

This invention relates to a method for enriching the exhaust gases of a combustion engine with unburnt hydrocarbon, said combustion engine comprising a plurality of cylinders, at least one exhaust manifold for receiving exhaust gases from at least two of said plurality of cylinders, and an EGR circuit for supplying exhaust gases from said exhaust manifold to an air inlet of at least one of said cylinders, wherein said exhaust manifold comprises a first outlet for supplying exhaust gases to an exhaust aftertreatment system, and a second outlet for supplying exhaust gases to said EGR circuit.

The invention also relates to a computer program comprising program code means, a computer program product comprising program code means stored on a computer readable medium, as well as a computer system for implementing said method for enriching the exhaust gases of a combustion engine with unburnt hydrocarbon.

The inventive method is particularly applicable for diesel engines where regeneration of the exhaust aftertreatment system periodically may be needed.

The diesel engine is known for operational reliability and low fuel consumption but does not produce as low emissions as, for example, a petrol engine provided with a three-way catalyst. One way of improving the emissions from a diesel engine is to fit a particle filter which filters soot and particles from the exhaust gases and/or the NOx post-treatment system. These filters are usually very effective and gather both large and small particles. To prevent the filter from becoming full of soot and causing a major pressure drop for the exhaust gases leaving the engine, the soot has to be burnt. One method is for this soot to be burnt by the nitrogen oxides contained in diesel exhaust gases. In that case, the portion of the nitrogen oxides that takes the form of NO2 can oxidise the soot within the temperature interval of about 250 to 400 Degrees centigrade but this process takes a relatively long time and needs to be more or less constantly active even if there is an oxidation catalyst before the filter or the filter itself is covered with a catalytic layer. Another method for oxidising soot accumulated in the particle filter is to heat the filter to about 600-650 degrees centigrade so that the surplus oxygen O2 from diesel combustion can oxidise the soot directly, which is a rapid process. Soot accumulated over many hours of operating time can be oxidised away in a time of the order of 5 to 10 minutes. The exhaust temperature of a diesel engine normally never reaches 600-650 Degrees centigrade particularly after a turbo unit whereby the turbine extracts power from the exhaust flow and causes a temperature drop. It is not unusual that the exhaust temperature after the turbine of the turbo unit is lower than 250 Degrees centigrade, which is a temperature below which an oxidation catalyst does not function properly.

Temporarily increased temperature of the exhaust for regeneration of a NOx trap, such as a particle filter, may for example be realised by supplying unburnt hydrocarbon, e.g. in the form of fuel into the exhaust gas upstream of the NOx trap or NOx catalyst. One common solution is to provide the exhaust system with a separate fuel injector for injecting unburnt hydrocarbon directly into the exhaust system upstream of the particulate filter. This solution however requires an additional fuel injector located within the exhaust system, as well as fuel supply lines to said additional fuel injector, thereby increasing the cost, maintenance requirement, and risk of malfunction of the exhaust aftertreatment system.

According to an alternative solution, unburnt hydrocarbon is supplied by in-cylinder post injection of fuel into one or more cylinders. This solution thus does not require an additional fuel injector for providing unburnt hydrocarbon to the exhaust gas. Some of the most modern diesel engines are often equipped with exhaust gas recirculation (EGR) to reduce emissions of nitrogen oxides. Combining in-cylinder post injection, EGR system, and particle filters and/or NOx post-treatment by so-called NOx trap or NOx catalyst entails complications, such as potential contamination of the EGR circuit by unburnt hydrocarbon, as well as enriching the intake air with the unburnt hydrocarbon, possibly resulting in altered combustion conditions. There are therefore gains to be made by channeling exhaust gases with unburnt hydrocarbon to the exhaust system for regeneration purposes, but preventing unburnt hydrocarbon from being recirculated in the EGR circuit.

These adverse effects due to fuel in the EGR circuit can be prevented by selectively closing the EGR circuit when late post-injection takes place, as disclosed in US20060196178 A1, or by applying in-cylinder post injection only in carefully selected cylinders in combination with a specifically designed exhaust manifold, as disclosed in US2008110161, or by providing an exhaust system that is divided into two portions in combination with in-cylinder post injection in certain designated cylinders, as disclosed in U.S. Pat. No. 5,987,884 and U.S. Pat. No. 6,141,959.

The method of controlling exhaust gas flow by means of controllable valve means or internal partition walls dividing the exhaust manifold and/or system into at least two portions results in a more expensive exhaust system, and requires more space for installation. A specifically designed exhaust manifold however requires significant design effort and limits the possible design possibilities of the exhaust manifold. There is thus a need for an improved method for enriching the exhaust gases of a combustion engine with unburnt hydrocarbon that removes the above mentioned disadvantages.

It is desirable to provide a method for enriching the exhaust gases of a combustion engine with unburnt hydrocarbon where the previously mentioned problem is at least partly avoided.

The invention concerns, according to an aspect thereof, a method for enriching the exhaust gases of a combustion engine with unburnt hydrocarbon, said combustion engine comprising a plurality of cylinders, at least one exhaust manifold for receiving exhaust gases from at least two of said plurality of cylinders, and an EGR circuit for supplying exhaust gases from said exhaust manifold to an air inlet of at least one of said cylinders, wherein said exhaust manifold comprises a first outlet for supplying exhaust gases to an exhaust aftertreatment system, and a second outlet for supplying exhaust gases to said EGR circuit.

The invention is characterized, according to an aspect thereof, by the step of monitoring engine operating conditions, and performing in-cylinder post injection of said unburnt hydrocarbon into one predetermined cylinder of said at least two cylinders connected to the exhaust manifold when the monitored engine operating conditions equal predetermined engine operating conditions, which predetermined engine operating conditions are set for resulting in a substantially zero flow of said post-injected hydrocarbon to the EGR circuit for the specific design of the engine in operation.

One advantageous effect of the method according to an aspect of the invention is the possibility to omit any fuel injector arranged in the exhaust system for the sole purpose of regenerating parts of the exhaust aftertreatment system by heating, and instead using one or more of the existing combustion cylinders fuel injectors for this purpose. Omission of a fuel injector within the exhaust system results in reduced costs and increased reliability of the engine and exhaust system. A further advantage is a high degree of separation of exhaust gas from cylinder in which post injection of fuel is performed and exhaust gas entering the EGR circuit, without expensive or space-consuming measures. Furthermore, the inventive method allows simultaneous in-cylinder post injection of fuel and active EGR operation, such that a continuously high level of NOx reduction by the EGR system can be provided.

Further advantages are achieved by implementing one or several of the features of the dependent claims.

A combination of said one predetermined cylinder and said predetermined engine operating conditions may be based on a mapping and/or modelling from which cylinder the exhaust gases flowing through said EGR circuit origins at different engine operating conditions. In other words, the mapping and/or modelling is used to determine from which individual cylinder the exhaust gas flowing in the EGR circuit origins and thereby to determine which cylinder the in-cylinder post injection of fuel advantageously should be conducted for a specific engine operating condition. Upon determining that the exhaust gas from one or more cylinders not at all, or only to a small degree, enters the EGR circuit, then this one or more cylinders can be registered as suitable for said fuel post injection upon registering required predetermined engine operating conditions.

It may be preferred to perform said in-cylinder post injection of said unburnt hydrocarbon into said one predetermined cylinder only when said monitored engine operating conditions equal said predetermined engine operating conditions, because then substantially normal operation of the EGR circuit can be realised.

The performance of in-cylinder post injection of said unburnt hydrocarbon into said one predetermined cylinder may be the only means for enriching the exhaust gases of said combustion engine with unburnt hydrocarbon and at the same time avoiding that the post-injected hydrocarbon reaches the EGR circuit.

The engine operating conditions may preferably comprise at least engine speed and engine load. An additional or alternative engine operating condition comprises exhaust gas flow rate in said EGR circuit, or a corresponding parameter.

The EGR circuit may be provided with a single EGR valve for each exhaust manifold, or for each set of cylinders, or for each engine. Conventional EGR systems uses a single EGR valve to control the EGR flow rate, and additional control valves for preventing unburnt hydrocarbon from entering the EGR circuit leads to increased costs and reduced reliability of the engine, as well as increased maintenance effort.

The first and second outlets may be positioned at a distance from each other in a direction parallel with an alignment direction of the cylinders connected to said at least one exhaust manifold. Separation of the first and second outlets in said direction increases the amount of engine operating conditions in which fuel post injection can be performed without too high level of unburnt hydrocarbons entering the EGR circuit.

The exhaust manifold may preferably be free from internal partition walls and/or controllable flow valves.

The present invention further provide, according to an aspect thereof, a computer program comprising program code means for performing all the steps of the inventive method described above when said program is run on a computer.

The present invention further provides, according to an aspect thereof, a computer program product comprising program code means stored on a computer readable medium for performing all the steps of the inventive method described above when said program product is nm on a computer.

The present invention further provides, according to an aspect thereof, a computer system for implementing the method for enriching the exhaust gases of a combustion engine with unburnt hydrocarbon, said combustion engine comprising a plurality of cylinders, at least one exhaust manifold for receiving exhaust gases from at least two of said plurality of cylinders, and an EGR circuit for supplying exhaust gases from said exhaust manifold to an air inlet of at least one of said cylinders, wherein said exhaust manifold comprises a first outlet for supplying exhaust gases to an exhaust aftertreatment system, and a second outlet for supplying exhaust gases to said EGR circuit, the computer system comprising a processor operable to monitor engine operating conditions and commanding in-cylinder post injection of said unburnt hydrocarbon into one predetermined cylinder of said at least two cylinders connected to the exhaust manifold when the monitored engine operating conditions equal predetermined engine operating conditions, which predetermined engine operating conditions are set for resulting in a substantially zero flow of said post-injected hydrocarbon to the EGR circuit for the specific design of the engine in operation.

BRIEF DESCRIPTION OF DRAWINGS

In the detailed description of the invention given below reference is made to the following figure, in which.

DETAILED DESCRIPTION

Various aspects of the invention will hereinafter be described in conjunction with the appended drawings to illustrate and not to limit the invention, wherein like designations denote like elements, and variations of the inventive aspects are not restricted to the specifically shown embodiment, but are applicable on other variations of the invention.

Figure 1:
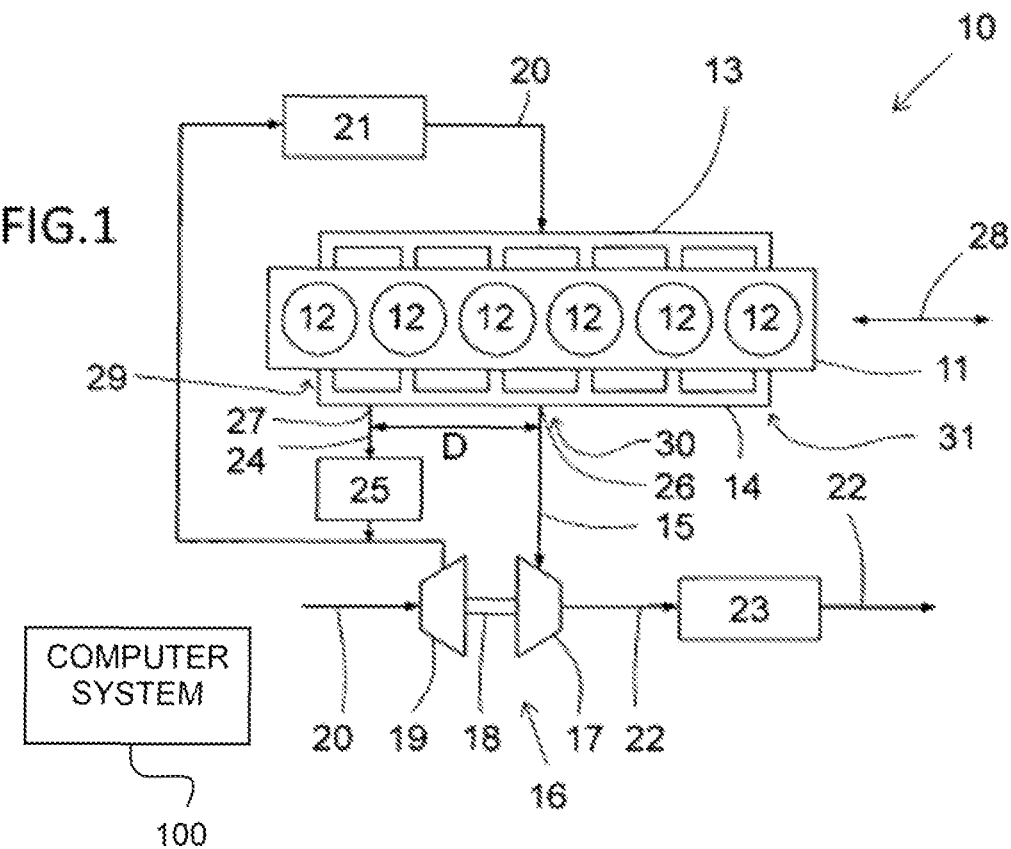
FIG. 1 shows an engine layout on which the method according to an aspect of the invention can be applied.

The combustion engine 10 schematically depicted in FIG. 1 comprises an engine block 11 with six piston-cylinders 12 with an inlet manifold 13 and an exhaust manifold 14. Exhaust gases are led via an exhaust passage 15 to the turbine wheel 17 of a turbo unit 16. Said exhaust passage 15 being connected to the exhaust manifold 14 at a first outlet 26 of the exhaust manifold 14. The turbine shaft 18 drives the compressor wheel 19 of the turbo unit 16 that compresses air coming in via an inlet passage 20 and passes it on via a charge air cooler 21 to the inlet manifold 13. Fuel is supplied to the respective cylinders 12 via (undepicted) injection devices.

Exhaust gases which have passed through the turbine unit 16 are led to the atmosphere via the exhaust line 22, which leads the exhaust gases through an exhaust aftertreatment system 23 that includes a regenerable particle trap or NOx trap. Regeneration of the particle trap is effected by supply of unburnt fuel from any of the cylinders 12, e.g. by so-called "post-injection", which by oxidation of the fuel in a catalyst upstream of the particle filter raises the temperature in the particle trap sufficiently for soot in the latter to ignite and burn away.

Exhaust gases from the exhaust manifold 14 are also led back to the inlet side of the engine 10 via a conduit 24 in order to reduce the discharge of nitrogen oxides from the engine 10 by known exhaust gas recirculation (EGR) technology. Said conduit 24 being connected to the exhaust manifold 14 at a second outlet 27 of the exhaust manifold 14. This EGR circuit comprises a valve 25 serving both as a one-way valve and as a control valve for regulating the EGR flow.

In-cylinder post injection is effected with a crankshaft angle interval in which the conditions for the fuel to ignite in the cylinder are not fulfilled. This is for example the case when the fuel is injected into a cylinder 12 during the latter part of the expansion stroke or during the exhaust stroke. If the fuel is injected into the cylinder 12, the same injection equipment can preferably be used as for the ordinary fuel injection.

The method according to the invention for enriching the exhaust gases of a combustion engine 10 with unburnt hydrocarbon comprises the steps of monitoring engine operating conditions, and performing in-cylinder post injection of fuel when the monitored engine operating conditions equal predetermined engine operating conditions. The monitoring step can for example be realised by acquiring desired engine operating conditions, either be sensors or model based estimations, with a sufficient sampling frequency. Preferred engine operating conditions according to the invention are engine speed and engine load. An additional or alternative engine operating condition is exhaust gas flow rate in the EGR circuit. Engine speed is easily measured using a camshaft speed sensor or the like. Engine load may be either be estimated using for example an engine load model, which include fuel injection data, or the like, or measured using for example an engine output torque measurement, or the like. Exhaust gas flow rate in the EGR circuit may be measured, for example by means of an EGR flow meter, or estimated based on various relevant parameters.

The step of performing in-cylinder post injection of fuel when the monitored engine operating conditions equal predetermined engine operating conditions may be realised by an engine management system that is configured to continuously check if the current engine operating conditions equal the predetermined engine operating conditions, and commanding in-cylinder post injection of fuel into a predetermined cylinder 12 when said current engine conditions and predetermined engine conditions coincide. Each of said predetermined engine operating conditions here corresponds to one or more predetermined ranges of that individual operating condition.

Figure 3:
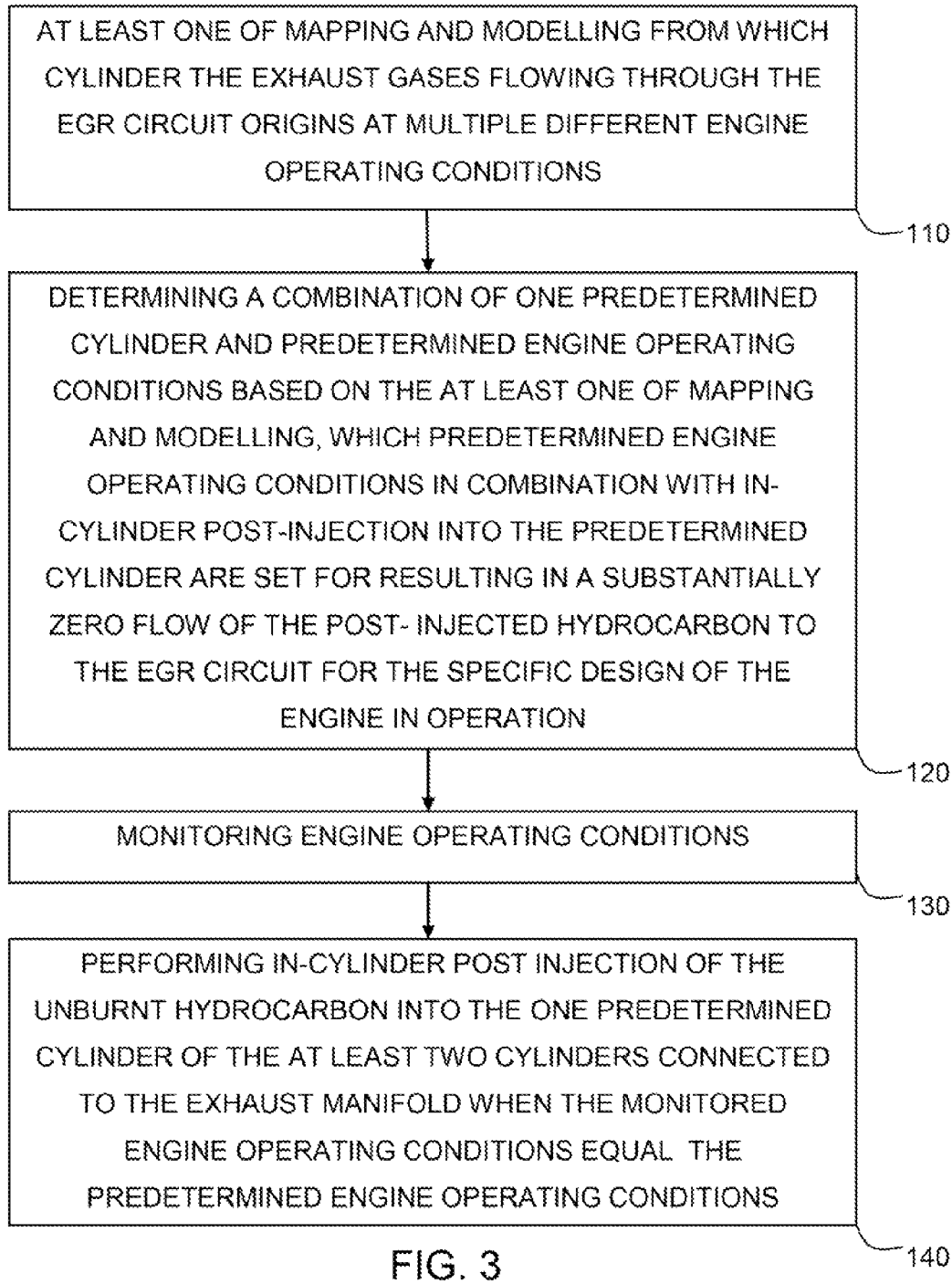
FIG. 3 is a flow chart showing steps in a method according to an aspect of the invention.

The predetermined, engine operating conditions, in combination with in cylinder post injection into the predetermined cylinder 12, are set for resulting in a substantially zero flow of the post-injected hydrocarbon to the EGR circuit for the specific design of the engine in operation (Step 120, FIG. 31). This effect is accomplished by mapping from which cylinder 12 the exhaust gases flowing through the EGR circuit origins at the different engine operating conditions. The mapping and/or modelling (Step 110, FIG. 3) thus aims to determine the exhaust gas flow route from each individual cylinder of the engine 10, for multiple different operating conditions. Ideally, the mapping and/or modelling establishes the exhaust gas flow route of each individual cylinder of the engine for all different operating conditions, but due to limitations in the effort of acquiring said individual cylinder exhaust gas flow, the resulting exhaust gas flow map may have a reduced degree of resolution, being based on a reasonable number of different engine operating conditions instead.

Figure 2:
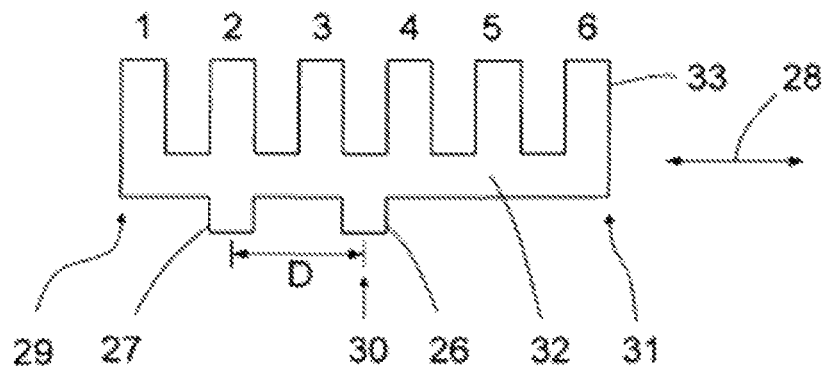
FIG. 2 shows schematically a 2D layout of a typical exhaust manifold to be used with the engine of FIG. 1.

Table 1 below illustrates a first example of such a mapping, which shows from which cylinder the exhaust gases flowing through the EGR circuit comes from. The specific mapping of table 1 is based on modelling and simulation of an exhaust manifold layout as schematically depicted in FIG. 2. The mapping of table 1 illustrates the cylinder origin of the exhaust gases flowing through the EGR circuit with the following engine operating conditions: Engine speed 28.3 rotation per second; max engine load.

TABLE 1

| Cyl. 1 | 32.9% |
|---|---|
| Cyl. 2 | 29.8% |
| Cyl. 3 | 23.0% |
| Cyl. 4 | 2.7% |
| Cyl. 5 | 7.7% |
| Cyl. 6 | 4.4% |

From table 1, it is clear that cylinders 4, 5 and 6 contribute relatively little to the exhaust gases of the EGR circuit, making each of them potential cylinders 12 for performing in-cylinder post injection of fuel, since only a very small amount of the injected fuel would enter the EGR circuit.

Table 2 below illustrates a second example of such a mapping based also on the exhaust layout of FIG. 2, but in a low engine speed mode having the following engine operating conditions: Engine speed 19.5 rotation per second; max engine load.

TABLE 2

| Cyl. 1 | 33.4% |
|---|---|
| Cyl. 2 | 28.2% |
| Cyl. 3 | 20.3% |
| Cyl. 4 | 4.2% |
| Cyl. 5 | 6.9% |
| Cyl. 6 | 7.0% |

The data of table 2 corresponds to a large degree the earlier high engine speed mode, and also here is established that each of cylinders 4, 5 and 6 contributes relatively little to the exhaust gases of the EGR circuit, making each of them potential cylinders 12 for performing in-cylinder post injection of fuel.

The mapping was here made by analysing the exhaust flow pattern using a 3D computational fluid dynamic CFD model of the exhaust manifold and EGR valve housing, coupled with an engine performance simulation software program, which is based on model of the physical engine used, including parameters such as pipe dimensions, location and shape of the EGR circuit, etc. The engine performance simulation program and the 3D CFD model were interconnected by means of eight CFD-Connections corresponding to exhaust manifold cylinder connections 1, 2, 3, 4, 5, 6, manifold turbine connection 26, and manifold EGR circuit connection 27. Alternatively, or in addition, the mapping may be realised by measuring of the exhaust gas flow pattern.

The EGR valve was here modelled in a fully open position, and assumptions on thermodynamic properties, such as molar weight, viscosity, specific heat, temperature and conductivity, was included in the CFD-analysis. The CFD model was simulated stand alone and transiently with time varying mass flow, pressure and temperature data imposed at boundaries thereof. Mass flows and temperature were imposed at the cylinder connections 1, 2, 3, 4, 5, 6, and pressure and temperature were imposed at the turbine connection 26 and EGR-circuit connection 27. Each exhaust port boundary was assigned its own scalar with identical passive properties for the purpose of tracking the route of the exhaust gas from each cylinder.

From the result above, it is clear that mapping of the EGR exhaust gas cylinder origin at different engine operating conditions is possible for all possible engine configurations, and that combinations of in-cylinder post injection of fuel into one individual cylinder 12 during periods of certain engine operating conditions resulting in significantly reduced level of unburnt hydrocarbon entering the EGR circuit, or even completely prevented, can be determined. Moreover, the result is accomplished despite the exhaust system not being divided into separate portions, despite no additional control valve except the EGR valve is present in the exhaust manifold 14 for preventing post-injected fuel from entering the EGR circuit, and despite all the exhaust gases being collected in one and the same duct of the exhaust manifold 14 entirely outside the exhaust ports of each cylinder 12. As a result of the inventive effect, there is also no need to separate fuel post injection timing and EGR timing, i.e. to close the EGR valve 25 during periods of the in cylinder post injection of fuel, but the EGR circuit can remain in operating conditions, thereby maintaining a high NOx reduction. Simultaneous in cylinder post injection of fuel and conventional EGR circuit operation may consequently be performed.

In cylinder post injection of unburnt hydrocarbon into the predetermined cylinder 12 (step 140 of FIG. 3) is preferably only performed when the monitored engine operating conditions (monitoring at step 130 of FIG. 3) equal the predetermined engine operating conditions. This strategy normally results in small or insignificant amount of unburnt hydrocarbons entering the EGR circuit, depending, on exhaust manifold design. If however regeneration of a part of the exhaust aftertreatment system 23 is urgently required, and in-cylinder post injection of fuel into a cylinder 12 is the only means for enriching the exhaust gases of the combustion engine 10 with unburnt hydrocarbon, and the predetermined engine operating conditions have still not been detected by the engine management system that monitors the engine operating conditions, in-cylinder post injection of fuel may exceptionally be required performed anyway. Possibly, the EGR valve 25 may be closed during this post injection period to prevent unburnt fuel from entering the EGR.

The inventive method regenerates at least a part of the exhaust aftertreatment system 23 by means of the post-injected hydrocarbon. The main part requiring regeneration is the diesel exhaust gas particulate filter, which occasionally may be heated up sufficiently to burn off the captured soot particulates therein.

Many different alternative exhaust manifold layouts are possible within the scope of the invention, but a certain spacing of the first and second outlets 26, 27 is generally required to achieve a reduced level of unburnt fuel entering the EGR circuit. In the exhaust manifold layout of FIG. 2, the first and second outlets 26, 27 are positioned at a distance D from each other in a direction parallel with the alignment direction 28 of the cylinders 1 connected to the exhaust manifold 14. The second outlet 27 is here positioned between a first end 29 of the manifold and a centre point 30 of the exhaust manifold 14. Preferably the predetermined cylinder 12 selected for post-injection of hydrocarbon is positioned between a second end 31 of the exhaust manifold 14 and the centre point 30 of the exhaust manifold 14. Thereby, unburnt fuel injected into the exhaust manifold is likely exhausted via the first outlet 26. The illustrated layout of FIG. 2 should merely be seen as an exemplary layout, and both the first and/or second outlet 26, 27 may be positioned more or less towards the first or second ends 29, 31 of the manifold 14, without departing from the invention, as long as a combination of cylinder for fuel post injection and engine operating conditions can be determined that results in reduced levels of unburnt fuel within the EGR circuit.

In FIG. 2, the first outlet 26 is arranged centrally of the exhaust manifold 14 as seen in the alignment direction 28 of the cylinders 12 connected to the exhaust manifold 14, and the second outlet 27 is offset a distance D towards the first end 29 from the first outlet 26 in the alignment direction 28 of the cylinders 12. More exact, the second outlet 27 is arranged oppositely an inlet from the second cylinder 12. The exhaust manifold 14 is generally formed by a single duct 32, from which individual pipe segments 33 extend to each individual cylinder 12 of the engine 10 associated with the specific exhaust manifold 14. Exhaust gases from different cylinders 12 entering the common single duct 32 is thus free to mix since no internal partition walls for dividing the single duct 32 into multiple segments exist. The first and second outlets 26, 27 are arranged in fluid connection with the single duct 32, and no valve means are included to control the exhaust gas flow into a specific outlet 26, 27. There are also no valves for this purpose in the exhaust pipes 15, 24 connected to the first and second outlets 26, 27, other than possibly a conventional EGR valve of the EGR circuit.

As previously mentioned, the engine 10 according to the embodiment of FIG. 1 comprises six cylinders 12 arranged in a straight line along the alignment axis 28. However, the inventive method is not limited to this engine configuration, but other straight or V engine configurations are included within the scope of the invention, such as for example straight four or five cylinder configuration, a V6 or V8 cylinder configuration. For V cylinder configurations, a separate exhaust manifold 14 is normally provided for each row of cylinders 12.

The invention also includes a computer program comprising program code means for performing all the steps of the inventive method, when the program is run on a computer. A computer program product comprising the program code means may be stored on a computer readable medium. The invention further encompasses a computer system 100 (FIG. 1) for implementing the inventive method described above.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. Method for enriching the exhaust gases of a combustion engine with unburnt hydrocarbon by means of in-cylinder post injection of unburnt hydrocarbon, the combustion engine comprising a plurality of cylinders, at least one exhaust manifold for receiving exhaust gases from at least two of the plurality of cylinders, and an EGR circuit for supplying exhaust gases from the exhaust manifold to an air inlet of at least one of the cylinders, wherein the exhaust manifold comprises a first outlet for supplying exhaust gases to an exhaust aftertreatment system, and a second outlet for supplying exhaust gases to the EGR circuit, the method comprising
for multiple different engine operating conditions in which exhaust gases flow through the EGR circuit at least one of mapping and modelling from which cylinder the exhaust gases flowing through the EGR circuit originates at multiple different engine operating conditions, determining a combination of one predetermined cylinder and predetermined engine operating conditions based on the at least one of mapping and modelling, which predetermined engine operating, conditions in combination with in-cylinder post-injection into the predetermined cylinder are set for resulting in a substantially zero flow of the post injected hydrocarbon to the EGR circuit for the specific design of the engine in operation, monitoring engine operating conditions, and performing in-cylinder post injection of the unburnt hydrocarbon into the one predetermined cylinder of the at least two cylinders connected to the exhaust manifold when the monitored engine operating conditions equal the predetermined engine operating conditions.

2. The method according to claim 1, wherein the method comprising the step of regenerating at least a part of the exhaust aftertreatment system by means of the post-injected hydrocarbon.

3. The method according to claim 1, wherein the method comprising the step of performing the in-cylinder post injection of the unburnt hydrocarbon into the one predetermined cylinder only when the monitored engine operating conditions equal the predetermined engine operating conditions.

4. The method according to claim 1, wherein the performance of in-cylinder post injection of the unburnt hydrocarbon into the one predetermined cylinder is the only means for enriching, the exhaust gases of the combustion engine with unburnt hydrocarbon and at the same time avoiding the post-injected hydrocarbon to reach the EGR circuit.

5. The method according to claim 1, wherein the engine operating conditions comprise at least engine speed and engine load.

6. The method according to claim 5, wherein the engine operating conditions comprise exhaust gas flow in the EGR circuit.

7. The method according to claim 1, wherein the specific design of the engine in operation is such that the EGR circuit is provided with a single EGR valve for each exhaust manifold, or for each set of cylinders, or for each engine.

8. The method according to claim 1, wherein the specific design of the engine in operation is such that the first and second outlets are positioned at a distance from each other in a direction parallel with an alignment direction of the cylinders connected to the at least one exhaust manifold.

9. The method according to claim 1, wherein the specific design of the engine in operation is such that the second outlet is positioned between a first end of the manifold and a centre point of the manifold and that the predetermined cylinder selected for post-injection of hydrocarbon is positioned between a second end of the manifold and the centre point of the manifold.

10. The method according to claim 1, wherein the specific design of the engine in operation is such that the engine comprises at least four cylinders arranged in a straight line, and that the second outlet is positioned substantially offset front the first outlet in the alignment direction of the cylinders.

11. The method according to claim 1, wherein the specific design of the engine in operation is such that that the engine comprises six cylinders arranged in a straight line.

12. The method according to claim 1, Wherein the specific design of the engine In operation is such that the exhaust manifold is free from at least one of internal partition walls and controllable.

13. A computer comprising program code for performing method for enriching the exhaust gases of a combustion engine with unburnt hydrocarbon by means of in-cylinders, at least one exhaust manifold for receiving exhaust engine comprising a plurality of cylinders, at least one exhaust manifold for receiving exhaust gases from at least two of the plurality of cylinders, and an EGR circuit for supplying exhaust gases from the exhaust manifold to an air inlet of at least one of the cylinders, wherein the exhaust manifold comprises a first outlet for supplying exhaust gases to an exhaust aftertreatment system, and a second outlet for supplying exhaust gases to the EGR circuit, the method comprising for multiple different engine operating conditions in which exhaust gases flow through the EGR circuit at least one of mapping and modelling from which cylinder the exhaust gases flowing through the EGR circuit originates at multiple different engine operating conditions, determining a combination of one predetermined cylinder and predetermined engine operating conditions based on the at least one of mapping and modelling, which predetermined engine operating conditions in combination with in-cylinder post-injection into the predetermined cylinder are set for resulting in a substantially zero flow of the post-injected hydrocarbon to the EGR circuit for the specific design of the engine in operation, monitoring engine operating conditions, and performing in-cylinder post injection of the unburnt hydrocarbon into the one predetermined cylinder of the at least two cylinders connected to the exhaust manifold when the monitored engine operating conditions equal the predetermined engine operating conditions when the program is run on the computer.

14. A non-transitory computer program product comprising program code stored on a computer readable medium for performing method for enriching the exhaust gases of a combustion engine with unburnt hydrocarbon by means of in-cylinder post injection of unburnt hydrocarbon, the combustion engine comprising a plurality of cylinders at least one exhaust manifold for receiving exhaust gases from at least two of the plurality of cylinders, and an EGR circuit for supplying exhaust gases from the exhaust manifold to an air inlet of at least one of the cylinders, wherein the exhaust manifold comprises a first outlet for supplying exhaust gases to an exhaust aftertreatment system, and a second outlet for supplying exhaust gases to the EGR circuit, the method comprising for multiple different engine operating conditions in which exhaust gases flow through the EGR circuit at least one of mapping and modelling from which cylinder the exhaust gases flowing through the EGR circuit originates at multiple different engine operating conditions, determining a combination of one predetermined cylinder and predetermined engine operating conditions based on the at least one of mapping and modelling, which predetermined engine operating conditions in combination with in-cylinder post-injection into the predetermined cylinder are set for resulting in a substantially zero flow of the post-injected hydrocarbon to the EGR circuit for the specific design of the engine in operation, monitoring engine operating conditions, and performing in-cylinder post injection of the unburnt hydrocarbon into the one predetermined cylinder of the at least two cylinders connected to the exhaust manifold when the monitored engine operating conditions equal the predetermined engine operating conditions when the program product is run on a computer.

15. A computer system for implementing a method for enriching the exhaust gases of a combustion engine with unburnt hydrocarbon by means of in-cylinder post injection of unburnt hydrocarbon, the combustion engine comprising a plurality of cylinders, at feast one exhaust manifold for receiving exhaust gases from at least two of the plurality of cylinders, and an EGR circuit for supplying exhaust gases from the exhaust manifold to an air inlet of at least one of the cylinders, wherein the exhaust manifold comprises a first outlet for supplying exhaust gases to an exhaust aftertreatment system, and a second outlet for supplying exhaust gases to the EGR circuit, the computer system comprising a processor operable, for multiple different engine operating conditions in which exhaust gases flow through the EGR circuit, to at least one of map and model from which cylinder the exhaust gases flowing through the EGR circuit originates at multiple different engine operating conditions, determining a combination of one predetermined cylinder and predetermined engine operating conditions based on the at least one of mapping and modelling, which predetermined engine operating conditions in combination with in-cylinder post-injection into the predetermined cylinder are set for resulting in a substantially zero flow of the post-injected hydrocarbon to the EGR circuit for the specific design of the engine in operation monitoring engine operating conditions, and commanding in-cylinder post injection of the unburnt hydrocarbon into the one predetermined cylinder of the at least two cylinders connected to the exhaust manifold when the monitored engine operating conditions equal the predetermined engine operating conditions.

* * * * *